United States Patent
Silverman et al.

[15] 3,680,040
[45] July 25, 1972

[54] METHOD AND APPARATUS FOR THE ANALYSIS OF SEISMIC RECORDS

[72] Inventors: Daniel Silverman; Sven Treitel, both of Tulsa, Okla.

[73] Assignee: Amoco Production Company, Tulsa, Okla.

[22] Filed: May 4, 1970

[21] Appl. No.: 34,514

Related U.S. Application Data

[63] Continuation of Ser. No. 450,806, April 26, 1965, abandoned.

[52] U.S. Cl. ............ 340/15.5 R, 340/15.5 CP, 340/15.5 CC, 340/15.5 TA
[51] Int. Cl. .................................................... G01v 1/28
[58] Field of Search ........... 340/15.5 MC, 15.5 CC, 15.5 TA, 340/15.5 DP, 3 M; 343/100 CL

[56] References Cited

UNITED STATES PATENTS

| | | | |
|---|---|---|---|
| 2,864,072 | 12/1958 | Blake | 340/3 M |
| 3,242,326 | 3/1966 | Cox | 340/15.5 |
| 2,794,965 | 6/1957 | Yost | 340/15.5 |
| 3,209,317 | 9/1965 | Webster | 340/15.5 |
| 3,076,177 | 1/1963 | Lawrence et al. | 340/15.5 |
| 2,989,726 | 6/1961 | Crawford et al. | 340/15.5 |

OTHER PUBLICATIONS

Rice, Inverse Convolution Filters, " Geophysics," Vol. 27, No. 1, Feb. 1962, pp. 4– 18
Extrapolation, Interpolation, and Smoothing of Stationary Time Series, Norbert Weiner, J. Wiley & M.I.T., 1949 1964

Primary Examiner—Benjamin A. Borchelt
Assistant Examiner—H. A. Birmiel
Attorney—Paul F. Hawley and John D. Gassett

[57] ABSTRACT

A method of analyzing a recorded seismic signal. An input signal impressed on the earth is controlled by a known drive signal. A Wiener operator $W_r$ is derived from (a) this known drive signal and (b) a selected desired output signal. Reflections from the transmitted input signal are recorded. The received or recorded signal is convolved with the Wiener operator $W_r$ to obtain the convolution thereof. The convolution contains compressed signals to indicate reflections from subsurface interfaces. Any known input signal and any selected output signal can be used.

12 Claims, 5 Drawing Figures

DANIEL SILVERMAN
SVEN TREITEL
*INVENTORS.*

BY *John D. Gassett*

ATTORNEY.

DANIEL SILVERMAN
SVEN TREITEL
INVENTORS.

BY John D. Gassett
ATTORNEY.

FIG.-4

DANIEL SILVERMAN
SVEN TREITEL
INVENTORS.

ATTORNEY.

METHOD AND APPARATUS FOR THE ANALYSIS OF SEISMIC RECORDS

This application is a continuation of co-pending application Ser. No. 450,806, entitled "Method and Apparatus for the Analysis of Seismic Records," filed Apr. 26, 1965, now abandoned, Daniel Silverman and Sven Treitel, inventors.

This invention relates to the field of seismic prospecting. It relates particularly to a method of prospecting in which a long-time duration seismic signal is imparted into the earth, and in which reflections of such input signal are detected, and the detected signal is processed.

BACKGROUND OF THE INVENTION

The major problems in the seismic art are (1) how to put a signal into the ground that remains the same as it travels through the earth and can be recognized at a receiving point, and (2) how to have sufficient energy so that the received signal will be large enough to be detected. One of the best ways for putting high energy seismic signals into the earth is by the use of dynamite. In that system a shot hole is normally drilled into the earth and loaded with a large charge of explosive which is subsequently detonated. Seismic waves are developed by this explosion and travel downwardly through the earth until they encounter subsurface intervals where portions of the waves are reflected back toward the surface of the earth. Such waves are detected at the earth's surface by use of geophones. This system has been used rather extensively but has certain inherent weaknesses. For example, it produces an input signal that changes character as it travels through the earth and is very difficult to recognize in the received signal.

If it is required to put a signal into the earth having a constant character, then one must use a way of putting a recognizable signal into the earth. This ordinarily precludes the use of dynamite in shot holes. One method which has found recent favor in putting a constant character signal into the earth is by the use of a suitable transducer, such as a hydraulically or electro-magnetically driven vibrator, which is coupled to the earth. The use of vibrators has a handicap in that the power input is low; thus, if vibrators are used, the input signal must have a long-time duration to obtain the total required energy. However, when vibrators are used a control or pilot signal controls the movement of the vibrator so that the signal imparted into the earth faithfully follows the control signal. As we have said, when using a low-energy source, one must use a signal of long-time duration to obtain the required total energy. If the pilot signal is of long duration, then one loses the advantage of high resolution or the ability to determine exactly when the long signal occurs; that is, when the reflected signal is detected at the surface.

Thus, if one wishes to use a vibrator, such as the commonly used hydraulically driven vibrator, for imparting a seismic signal into the earth which necessitates a control signal of long duration, then one is required in effect to shorten or compress the long detected signal. One way of accomplishing this, which is becoming fairly popular, is to choose as a control or pilot signal a sweep frequency signal which is of long duration and to correlate this pilot signal or its counterpart with the received signal. The sharper the autocorrelation of the input signal, the better is the compression which is obtained. In that system it is required that the control, or input signal, be unique (i.e., nonrepetitive) over a period of time longer than the greatest travel time to be measured.

In that prior art system the pilot signal and received signal are recorded on the same physical recording medium. The pilot signal is autocorrelated to determine a zero time base. Then a substantial portion of the total transmitted energy detected is crosscorrelated with the input pilot signal or its counterpart. The time between prominent amplitude variations and the zero time base as determined by the autocorrelation is used as a parameter of the travel time of the unique signal between the input point and the receiving point.

While the method described immediately above is finding fairly extensive use, it is nevertheless not without certain shortcomings. For example, 1. it requires a long input signal which is unique, that is, is nonrepetitive;
2. it requires the input control signal to have a sharp autocorrelation; and
3. it requires the step of correlating this long input signal with the still longer received signal.

SUMMARY OF THE INVENTION

It is thus seen that there is a need for a system whereby these drawbacks or hindrances are removed or at least reduced significantly. The present invention provides such a system. In the present system for example, any arbitrary input control signal can be used, i.e., no unique signal is required. Further, there is no requirement that the input signal have a sharp autocorrelation. Further, in this invention we can choose any desired shape of compressed signal. From this arbitrary input signal and desired shape of the compressed signal we determine what is called the Wiener operator, or $W_r$. The operator $W_r$ is that function which when convolved with the input signal will approximate the desired shape of the compressed signal; that is, the desired shape of the compressed signal to the best least squares fit. For a general discussion of determining the Wiener operator, attention is directed to a book by Norbert Wiener published in 1949, entitled "Extrapolation, Interpolation, and Smoothing of Stationary Time Series with Engineering Applications," M.I.T. and J. Wiley and Sons.

Briefly stated, our system of seismic exploration includes an input signal of known characteristics or determinable shape and recording reflections from such input signal. One preferably selects the desired shape of input signal which is believed best suited for the area under exploration. It is preferably a continuous signal of at least one second in duration. A Wiener operator $W_r$ is derived from such known input signal and a selected output or desired compressed signal. This operator $W_r$ is then convolved with the received signal. Convolution can be described, by example, as involving multiplying the recorded seismic signal by $W_r$ in one time relation and interval of time of the two signals and integrating the product of such multiplication; repeatedly shifting the relative time interval between the recorded seismic signal and the operator $W_r$ and integrating the product for each such shift and recording the value of the integral obtained.

The method of the present invention differs from and has the following advantages over the prior art methods using vibrators as discussed above: (1) We have a wide independent choice of input control signal. (2) We have independent choice of the shape of the compressed signal, for example, the compressed signal is not required to be the autocorrelation function of the input signal. (3) The prior art uses a correlation technique which is for the purpose of detecting similarities between the input signal and the received signal. We use a convolution system, which is a filtering system which does not necessarily look for similarities between input and output. (4) The Wiener operator can be selected to be much shorter than the input signal, thus our system takes much less computing time and costs less than the correlation process of the prior art.

BRIEF DESCRIPTION OF THE DRAWINGS

Other objects and a better understanding of the invention can be had from the following description taken in conjunction with the drawings, in which.

DETAILED DESCRIPTION OF THE INVENTION

Figure 1:
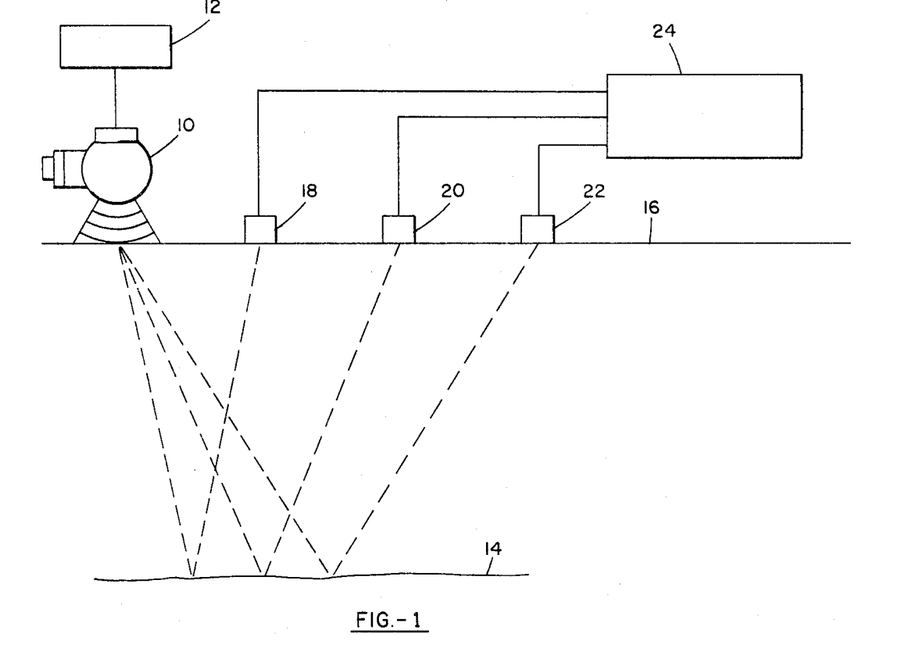
FIG. 1 illustrates an exploration system including the source and recorder for recording reflections.

FIG. 1 illustrates a typical geophysical prospecting system. Shown thereon is a vibrator 10 which can be a mechanical, hydraulic, electro-dynamic, or other type of transducer that can faithfully follow the control signal from the control signal source 12 so that a seismic counterpart of the control signal is impressed upon the earth. Waves from vibrator 10 travel downwardly until they reach an interface such as interface 14, where a part of the energy is reflected back to the surface 16 where it is detected by a plurality of geophones 18, 20 and 22 which are each connected to a recorder 24 in a conventional manner. Recorder 24 is preferably a multichannel magnetic type so that the recorded signal can readily be reproduced. The control signal for driving vibrator 10 can be any arbitrary signal desired.

Figure 2:
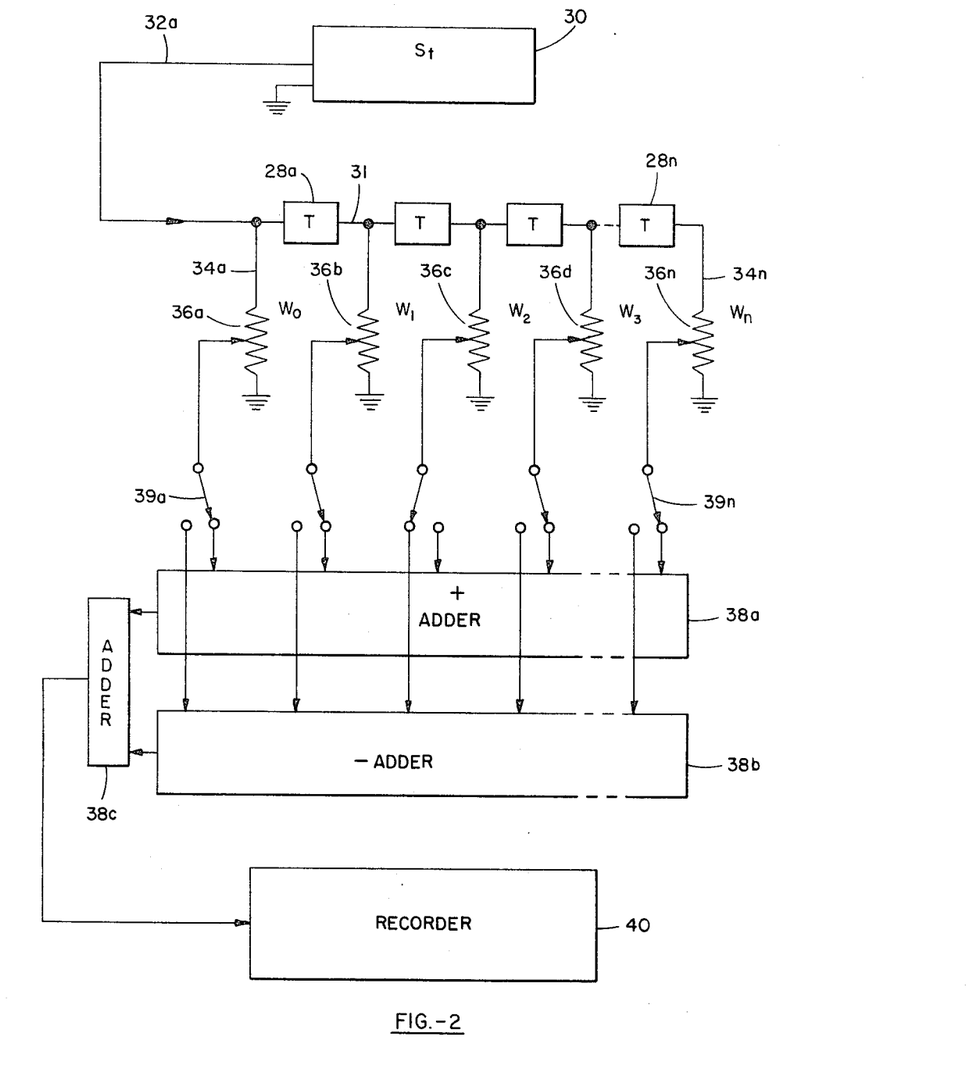
FIG. 2 illustrates an apparatus with which the recorded seismic signal is operated upon by a Wiener operator.

Each channel of the received seismic signal recorded on recorder 24 is a signal which is to be filtered or operated upon by the Wiener operator $W_\tau$. As will be seen more clearly hereinafter, the primary purpose of convolving a signal recorded on recorder 24, or the received signal, with the Wiener operator is to compress or shorten the long signal. Means for obtaining the Wiener operator will be discussed hereinafter. However, attention is now directed toward FIG. 2 which illustrates a device in which a received signal $S_t$ is convolved with the Wiener function $W_\tau$. A suitable apparatus or system is described in copending Application Ser. No. 358,870 filed for Daniel Silverman, Apr. 10, 1964. The apparatus of FIG. 2 (which is similar to that described in such application) includes an electrical delay line provided with a plurality of takeout taps spaced along its length to present, at predetermined time delays, the function $S_t$ applied to the input of the delay line; a multiplicity of potentiometers each connected to one of the taps for applying a second function to the apparatus; and an electrical summing network connected to the potentiometric networks for summing the outputs therefrom. More specifically, shown in FIG. 2 is an electric delay line 26 which is comprised of a series of delay units 28a to 28n such as lumped inductance-capacitance networks for time delay of an analog signal representative of a first function, such as the received seismic signal $S_t$ which is fed into the apparatus from reproducing means 30. Each delay line unit provides a specific known time delay T which for example can be from one to about four milliseconds. These delay line units 28 are connected in series to provide the total time delay desired which typically is at least about equal to the duration of the Wiener operator. For the sake of brevity, only a small number of delay units 28 are shown in FIG. 2, however, in practice a hundred or more may be used. The first delay unit is connected to reproducing means 30 by an electrical conductor 32A. The various delay units are connected by electrical conductors 31 to form a continuous circuit. Multiple takeout taps 34a to 34n are spaced along delay line 26 to present at specific time delays the signal voltage applied to the delay line after transmission over a preceding portion of the line.

A plurality of potentiometers 36a to 36n are connected respectively to taps 34a to 34n. As will be more fully explained, the potentiometers 36a to 36n are set proportionally to digital representations or time separated ordinates $W_0, \ldots, W_n$ of the Wiener operator $W_\tau$. In other words, the Wiener operator is set into the apparatus by adjusting the ratio value of the potentiometers. The output of each of potentiometers 36a to 36n is electrically connected either to adder 38a or 38b. Since the values of $W_0, \ldots W_n$ of the operator $W_\tau$ may be positive or negative, switches 39a, . . . ,39n are provided to connect the output of the potentiometers 36 to either the positive 38a or the negative adder 38b. The outputs of the two adders 38a and 38b are then added in proper sign by adder 38c to provide the true output of the convolution. The principle of adders for obtaining an algebraic summation of signals is well known; for example, reference is made to U.S. Pat. Nos. 2,557,070 and 2,838,742. The output of adder 38c is recorded on recorder 40. The recorded signal on recorder means 40 is the signal obtained by convolving the operator $W_\tau$ with the received signal $S_t$.

FIG. 1 shows or illustrates a system whereby an arbitrary signal can be imparted to the earth and reflections therefrom recorded. FIG. 2 illustrates apparatus whereby the received reflected signal can be operated upon by a particular Wiener operator $W_\tau$. Attention is next directed toward a discussion of how the Wiener operator $W_\tau$ is obtained. It is obtained from an input signal $S_t$ and a desired output $D_t$. Assume that $R_t$ is the result of the convolution of $S_t$ and $W_\tau$. It is found that $R_t$ is slightly different from the desired output signal $D_t$. The Wiener operator $W_\tau$ is determined from the input signal $S_t$ and the desired output signal $D_t$ by a mathematical process discovered by Norbert Wiener (supra). The solution is based on the principle that the sum of the squares of the differences between $D_t$ and $R_t$ be a minimum.

The basic principle in Wiener filtering is the least-squares criterion: one minimizes the sum of the squares of the differences between the desired output $D_t$ and the actual output $R_t$ for all values of $t$. In other words, one seeks to determine filter coefficients $W_\tau$ such that in the expression $$I = E\{(D_t - R_t)^2\} \tag{1}$$

term $I$ is a minimum, where the symbol $E$ represents the summing operation over all values of $t$. The quantity $I$ will be called the error energy. Its smallest achievable value for a given situation will yield the best, or "optimum" linear filter, in the least squares sense. To make this problem meaningful for calculation (for example, on a digital computer), we restrict ourselves to filters that have a finite number of coefficients. In order, these coefficients are $$W_\tau = W_0, W_1, W_2, \ldots, W_n \tag{2}$$

We then say that the filter $W_\tau$ is described by $(n+1)$ equispaced weighting coefficients, or simply that the filter is $(n+1)$ in length.

The output $R_t$ is the convolution of the filter coefficients $W_\tau$ with the input $S_t$, that is $$R_t = S_t * W_\tau = \sum_{\tau=0}^{n} W_\tau S_{t-\tau} = \sum_{\tau=0}^{n} S_\tau W_{t-\tau} \tag{3}$$

where * represents the mathematical step of convolution. We notice that the convolution process involves reversing in time the Wiener operator coefficients $W_\tau$, or the signal coefficients $S_\tau$ with respect to each other, prior to operation on the seismic signal. In other words, if the original sequence of Wiener operator coefficients is $$W_0, W_1, W_2, \ldots, W_n,$$

the reversed sequence is $$W_n, \ldots, W_2, W_1, W_0.$$

If the original sequence of the signal S is $$S_0, S_1, S_2, \ldots, S_n,$$

the reversed sequence is $$S_n, \ldots, S_2, S_1, S_0.$$

The convolution operation is described by equation (3). The error energy may then be written $$I = E(D_t - \sum_{\tau=0}^{n} W_\tau S_{t-\tau})^2 \tag{4}$$

This quantity is minimized by setting its partial derivatives with respect to each of the filter coefficients $W_\tau$ equal to zero, i.e., we set $$\frac{\delta I}{\delta W_\tau} = 0 \tag{5}$$

$$\tau = 0, 1, 2, \ldots, n$$

In this manner we obtain a system of ($n+1$) linear simultaneous equations in the unknown filter coefficients $W_\tau$. These equations can then be solved by the ordinary algebra of linear simultaneous equations.

The development of the derivation of the Wiener operator $W_\tau$ can be illustrated by a simple case. In this form the operator $W_\tau$ itself, $S_t$, and $D_t$ are expressed in digital form, that is, as a series of ordinates representing the amplitude of the corresponding time function at succeeding intervals of time, called the digital interval. This digital interval is taken the same for each function. The shorter these functions (the smaller the time duration and thus the smaller the number of the discrete values) the simpler the calculation. For illustration we shall use $S_t$ and $W_t$ as two units of time each, so that $S_t = (S_o, S_1)$ and $W_t = (W_o, W_1)$. The output $R_t$ is then three units in length. There is no limitation on the length of the desired output $D_t$ but it is generally desired to be shorter than $S_t$. We can then write the following equations:

$$S_t = (S_o, S_1) \quad (6)$$

$$W_t = (W_o, W_1) \quad (7)$$

$$R_t = (R_o, R_1, R_2) \quad (8)$$

$$D_t = (D_o, D_1, D_2) \quad (9)$$

We can now write the convolution in the form, $$R_t = S_t * W_t \quad (10)$$

$$= (S_o, S_1) * (W_o, W_1) \quad (11)$$

$$= (S_o W_o, S_o W_1 + S_1 W_o, S_1 W_1) \quad (12)$$

Since $R_t = (R_o, R_1, R_2)$ we can write the following expression $$(R_o, R_1, R_2) = (S_o W_o, S_o W_1 + S_1 W_o, S_1 W_1) \quad (13)$$

The squared difference between the desired and actual output is $$E\{(D_t - R_t)^2\} = (D_o - R_o)^2 + (D_1 - R_1)^2 + (D_2 - R_2)^2 \quad (14)$$

or, $$E\{(D_t - R_t)^2\} = (D_o - S_o W_o)^2 + (D_1 - [S_o W_1 + S_1 W_o])^2 + (D_2 - S_1 W_1)^2 \quad (15)$$

This shows that the sum of the squares of the differences between desired and actual outputs is a function of the Wiener operator. The Wiener operator $W_\tau$ is chosen so as to make this sum of squares a minimum. This is done by partial differentiation with respect to $W_o$ and $W_1$ and setting the results of each such differentiation equal to zero. This gives the following:

$$W_o(S_o^2 + S_1^2) + W_1(S_o S_1) = D_o S_o + D_1 S_1 \quad (16)$$

$$W_o(S_1 S_o) + W_1(S_o^2 + S_1^2) = D_1 S_o + D_2 S_1 \quad (17)$$

If we let $$A = S_o^2 + S_1^2 \quad (18)$$

$$B = S_1 S_o \quad (19)$$

$$C = D_o S_o + D_1 D_1 \quad (20)$$

$$D = D_1 S_o + D_2 S_1 \quad (21)$$

we can write the following equations $$W_o A + W_1 B = C \quad (22)$$

$$W_o B + W_1 A = D \quad (23)$$

Solving simultaneous equations (22) and (23) for $W_1$ and $W_2$, we get $$W_1 = \frac{CB - DA}{B^2 - A^2} \quad (24)$$

and $$W_0 = \frac{CA - DB}{A^2 - B^2} \quad (25)$$

Equations (24) and (25) provide the values for the determining of the Wiener operator $W_\tau$ in the simple example just given.

Figure 3:
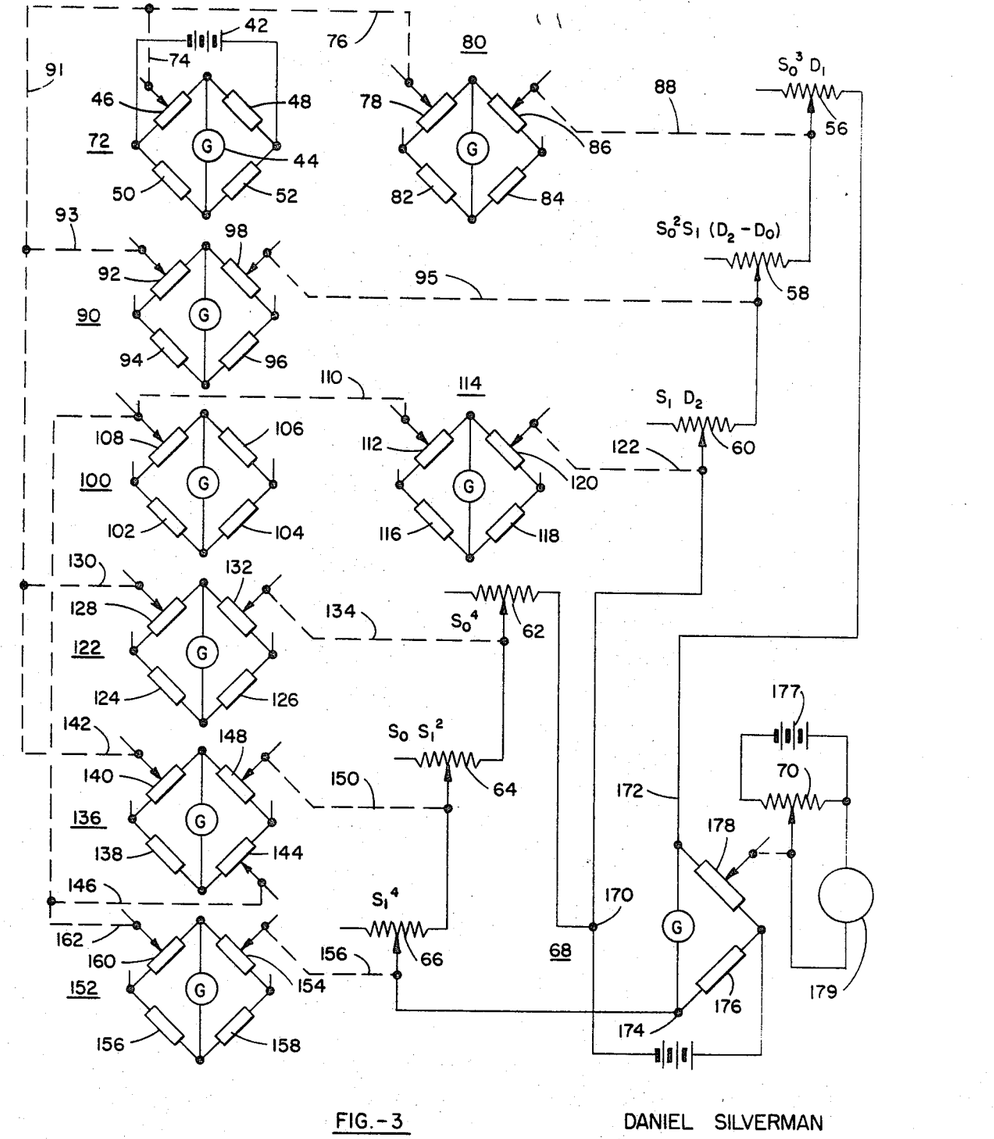
FIGS. 3 and 4 illustrate an apparatus for obtaining a Wiener operator from an input signal and a selected desired output signal.
Figure 4:
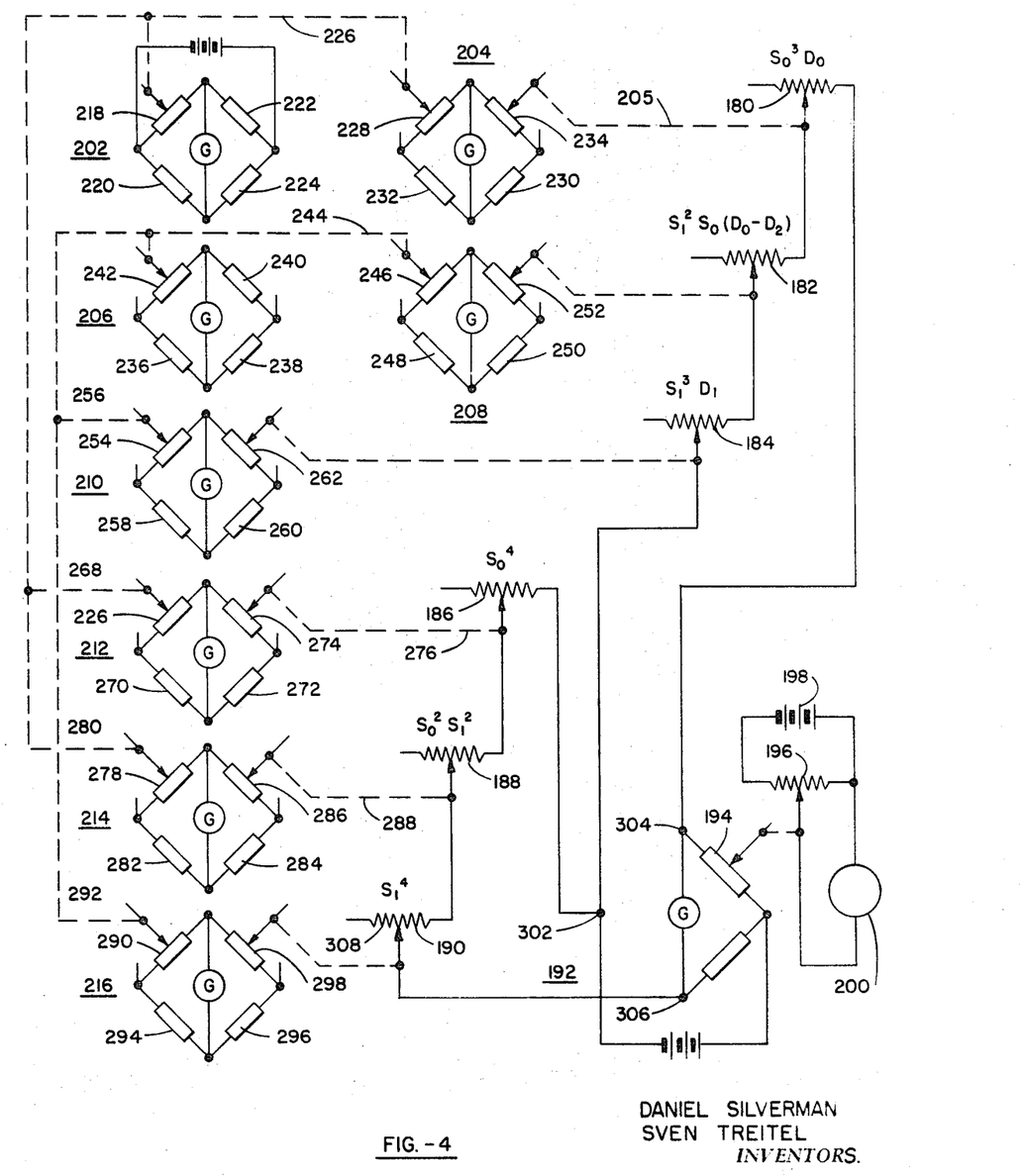
Figure 5:
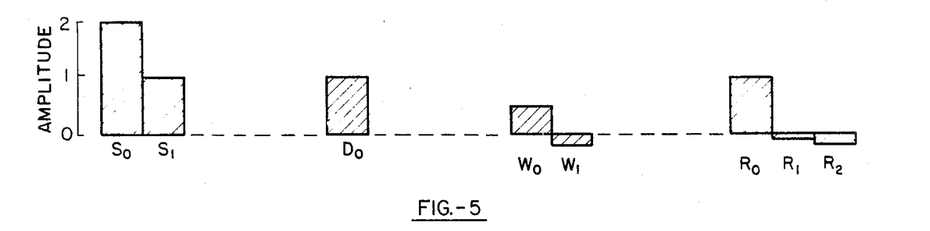
FIG. 5 illustrates various signals useful in describing the invention.

If, in this example, the signal is identified by $S_o = 2$ and $S_1 = 1$ and the desired output defined by $D_o = 1$, $D_1 = 0$ and $D_2 = 0$, then by definition of equations (19), (20), (21) and (22), $A = 5$, $B = 2$, $C = 2$ and $D = 0$. Solving we obtain $W_1 = -4/21$. and $W_o = 10/21$. We have thus defined the required Wiener operator to operate upon the input signal to approximate the desired output signal. The actual outputs is given by the numbers $R_o = 20/21$, $R_1 = 2/21$, $R_2 = -4/21$. The input, the desired output, the Wiener operator, and the actual output of this example are illustrated in FIG. 5. It is seen that the actual output approaches the desired output. The input signal $S_t$ has been operated upon to make its occurences rather prominent. While this is a rather simple example of defining the Wiener operator, this or any more complex situation can be solved on a digital computer. Further, this example can be readily solved on an analogous apparatus such as is shown in FIGS. 3 and 4. For a discussion of solving linear algebraic equations in an electronic digital computer, attention is directed to Mathematical Methods for Digital Computers edited by Ralston and Wilf and published by John Wiley and Sons, Inc., 1962, and especially to Chapter 2, page 39, "Matrix Inversions and Related Topics by Direct Methods."

The analog apparatus of FIGS. 3 and 4 is adapted to determine or define the Wiener operator in the example given immediately above from the digital definition of the input and desired outputs. As will be seen, $W_1$ can be obtained on the apparatus of FIG. 3 and $W_o$ can be obtained on the analog apparatus of FIG. 4. For this particular example, in order to find the coefficient $W_1$ we proceed by the substitution in equation (24) and obtain equation (26)

$$W_1 = \frac{(D_0 S_0 + D_1 S_1)(S_1 S_0) - (D_1 S_0 + D_2 S_1)(S_6^2 + S_1^2)}{S_1^2 S_0^2 - (S_0^4 + 2S_0^2 S_1^2 + S_1^4)} \quad (26)$$

Multiplying and simplifying, we obtain equation (27)

$$W_1 = \frac{S_0^3 D_1 + S_0^2 S_1(D_2 - D_0) + S_1^3 D_2}{S_0^4 + S_0^2 S_1^2 + S_1^4} \quad (27)$$

In order to find the coefficient $W_o$, we proceed by the substitution in equation (25) the values of $A$, $B$, $C$ and $D$ and obtain equation (28)

$$W_0 = \frac{(S_0^2 + S_1^2)(D_0 S_0 + D_1 S_1) - (D_1 S_0 + D_2 S_1)(S_1 S_0)}{(S_0^2 + S_1^2)^2 - (S_1 S_0)^2} \quad (28)$$

Multiplying and simplifying we obtain equation (29)

$$W_0 = \frac{S_0^3 D_0 + S_1^2 S_0(D_0 - D_2) + S_1^3 D_1}{S_0^4 + S_0^2 S_1^2 + S_1^4} \quad (29)$$

Upon examination of expressions (27) and (29), it is seen that each term within each expression is made up of the product of four terms and that $W_1$ and $W_o$ each are the quotient of the sum of three terms divided by the sum of three other terms. A Wheatstone bridge is a simple apparatus for doing multiplication and division of the type indicated in equations (27) and (29), provided the resistance arms are adjusted to represent the values of the terms in these equations.

Multiplication and division can be illustrated in Wheatstone bridge 72 of FIG. 3, for example, where battery 42 applies voltage to two opposite junctions while galvanometer 44 reads the voltage at the other two opposite junctions. When the galvanometer 44 reads zero, the bridge arms are in balance. At such balance, resistance $$46 = \frac{\text{Resistance 48} \times \text{Resistance 50}}{\text{Resistance 52}}.$$

If resistances 48 and 50 are each adjusted to have the value $S_o$ and resistance 52 equals 1, then at balance, resistance $46 = S_o^2$ . The resistances of the various arms are preferably of the variable or adjustable type which can readily be adjusted according to the value of the term it represents.

FIG. 3 illustrates analog apparatus for obtaining $W_1$. Shown in FIG. 3 are variable resistances 56, 58, 60, 62, 64 and 66 which as will be seen are adjusted by their setting and by the balancing of their associated Wheatstone bridges to represent $S_o^3 D_1$, $S_o^2 S_1 (D_2 - D_o)$, $S_1^3 D_2$, $S_o^4$, $S_o^2 S^{12}$ and $S_1^4$, respectively. It is seen that the first three terms are the terms of the numerator of equation (27) and the latter three terms are the denominator. Wheatstone bridge 68 performs this division and upon balance, resistance arm 178 is proportioned to $W_1$. Potentiometer 70 is mechanically linked to arm 178 and is thus proportional to $W_1$. Battery 177 and voltmeter 179 are provided so that the voltage controlled by potentiometer 70 can be measured.

In FIG. 3 there is a network of bridges which are isolated electrically but are interconnected mechanically, as shown by the dashed lines. These include bridges 72, 80, 90, 100, 114, 122, 136 and 152. For each of these, a voltage source (not shown) and galvanometer is provided such as indicated for bridge 72. Bridge 72 has four arms with arm 46 being adjusted at balance to equal $S_o^2$. As previously explained, with arms 48 and 50 each equal to or representative of $S_o$ and arm 52 equal to 1, when bridge 72 is balanced resistance 46 is proportional to $S_o^2$. The value or setting of resistance 46 is transmitted by mechanical linkage or connections 74 and 76 to a corresponding arm 78 of bridge 80. Thus arm 78 of bridge 80 is adjusted the same as arm 74. Arm 82 and arm 84 are adjusted respectively to values representing $1/D_1$ and $S_o$. When bridge 80 is balanced, the fourth arm 86 has a resistance setting or value corresponding to the quantity $S_o^3 D_1$. The value of the setting of arm 86 is transmitted through a mechanical linkage 88 to adjust variable resistance 56 to have the same value as resistance 86 of Wheatstone bridge 80. Thus resistor 56 is adjusted to be representative of the value $S_o^3 D_1$.

In a similar manner, one arm 92 of Wheatstone bridge 90 is adjusted by mechanical linkages 74, 91 and 93 to take on the same value as arm 46 of bridge 72. This value is representative of $S_o^2$. Arm 94 is set to represent $1/(D_2 - D_o)$ and arm 96 is set to represent $S_1$. The fourth arm 98 of bridge 90 at balance then represents the product $S_o^2 S_1 (D_2 - D_o)$. The slider on resistance 58 is mechanically connected by linkage 95 to variable resistance 98 and thus is set to this value.

Bridge 100 has four arms with arm 102 representing $S_1$, arm 104 representing 1, and arm 106 is adjusted to represent $S_1$. Upon balance arm 108 is representative of $S_1^2$. This adjustment of arm 108 is transmitted by mechanical linkage 110 to arm 112 of bridge 114. The other arms of bridge 114 are set such that arm 116 represents $1/D_2$ and arm 118 represents $S_1$. Upon balance arm 120 represents $S_1^3 D_2$ which is transmitted through mechanical linkage 122 to adjust resistor 60.

Wheatstone bridge 122 is used to obtain the value $S_o^4$. This is accomplished by setting one arm 124, representative of 1, $/S_o$ arm 126 is representative of $S_o$ and a third arm 128 has previously been set by mechanical linkages 74, 91 and 130 to be $S_o^2$ corresponding to arm 46 of bridge 72. Upon balance of the bridge, arm 132 represents $S_o^4$ which is transmitted by mechanical means 134 to adjust resistor 62.

Bridge 136 is set to obtain $S_o^2 S_1^2$. This is accomplished by setting one arm 138 equal to 1, arm 140 is automatically set by mechanical linkage 142 to be $S_o^2$ similar to arm 46 of bridge 72. Arm 144 is set to $S_1^2$ automatically by mechanical linkage 146 to be the same as arm 108 of bridge 100. Upon balance, arm 148 is representative of $S_o^2 S_1^2$ which is transmitted through mechanical linkage 150 to properly adjust resistor 64.

Bridge 152 is adjusted to give an output on arm 154 representative of $S_1^4$. This is accomplished by adjusting arms 156 and 158 respectively to $1/S_1$ and $S_1$. Arm 160 is automatically set to $S_1^2$ by mechanical linkage 162 which sets it in response to the setting of arm 108 of bridge 100. Upon balance, arm 154 is representative to $S_1^4$. This setting is transmitted through linkage 156 to adjust resistor 66.

Resistors 56, 58 and 60 are connected in series to obtain at terminals 170 and 172 a resistance equivalent to the value of the numerator of $W_1$. Resistances 62, 64 and 66 are connected in series to provide at terminals 174 and 170 a resistance corresponding to the denominator of $W_1$. These go into adjacent arms of bridge 68. The third arm 176 is set to unity. Upon balance, the fourth arm 178 is set to provide a resistance equal to $W_1$. This is communicated by linkage 178 to resistance 70 which in conjunction with battery 177 provides a current or voltage proportional to $W_1$.

FIG. 4 is provided to obtain the other coefficient $W_o$ of the operator $W_r$. Shown in FIG. 4 are variable resistances 180, 182, 184, 186, 188 and 190 which as will be seen are adjusted by the balancing of their associated Wheatstone bridges to represent $S_o^3 D_o$, $S_1^2 S_o (D_o - D_2)$, $S_1^3 D_1$, $S_o^4$, $S_o^2 S_1^2$ and $S_1^4$. It is seen that the first three terms are the terms of the numerator of equation (29) and the latter three terms are its denominator. Wheatstone bridge 192 performs this division and upon balance, resistance arm 194 is proportional to $W_o$. Potentiometer 196 is mechanically linked to arm 194 and is thus set proportional to $W_o$. Battery 198 and voltmeter 200 are provided so that the voltage controlled by potentiometer 196 can be measured. Thus we obtain the value of $W_o$.

In FIG. 4 there is a network of bridges which are isolated electrically but are interconnected mechanically as shown by the dashed lines. These include bridges 202, 204, 206, 208, 210, 212, 214, and 216. Each of these bridges includes a voltage source (not shown) and galvanometer, such as indicated for bridge 72 of FIG. 3 and bridge 202 of FIG. 4. The voltage sources have not been added to all of the bridges in FIG. 4 in an effort to simplify the drawing as much as possible. Bridge Bridge has four arms, with arm 218 being adjusted at balance to equal $S_o^2$. Arms 220 and 222 are each set to equal $S_o$ and arm 224 is set to 1. The value or setting of resistance arm 218 is transmitted by mechanical connection 226 to arm 228 of bridge 204. Arms 230 and 232 are respectively set to represent $S_o$ and $1 D_o$. Resistance arm 234 then upon balance has a resistance setting or value corresponding to the quantity $S_o^3 D_o$. This setting is transmitted through linkage 205 to variable resistance 180.

Bridges 206 and 208 are used to obtain the second term $S_1^2 S_o (D_o - D_2)$. Arms 236 and 240 of bridge 206 are each set to represent $S_1$ and arm 238 is set to represent 1. Upon balance arm 242 represents $S_1^2$. This is transmitted by mechanical linkage 244 to arm 246 of bridge 208. Arms 248 and 250 of bridge 208 are set respectively to values representative of $1/(D_o - D_2)$ and $S_o$. Upon balance arm 252 is set to be representative of the desired term $S_1^2 S_o (D_o - D_2)$. This value is transmitted through mechanical linkage 252 to set variable resistance 182.

Resistance arm 254 of bridge 210 is mechanically connected by linkage 256 to arm 242 of bridge 206. Thus arm 254 is set representative of $S_1^2$. Arms 258 and 260 of bridge 210 are set respectively to $1/D_1$ and $S_1$. Upon balance arm 262 is representative of $S_1^3 D_1$ which is transmitted by mechanical linkage 264 to set variable resistance 184 to a resistance representative of $S_1^3 D_1$.

Arm 266 of bridge 212 is connected by a mechanical linkage 268 to variable resistance arm 218 of bridge 202 and is therefore automatically set to $S_o^2$. Arms 270 and 272 of bridge 212 are respectively set to values of $1/S_o$ and $S_o$. Upon balance arm 274 is representative of $S_o^4$ which is transmitted by mechanical linkage 276 to variable resistance 186.

Arm 278 of bridge 214 is mechanically connected through linkage 280 to arm 218 of bridge 202 and is automatically set to a value $S_o^2$. Arms 282 and 284 of bridge 214 are adjusted respectively to values representative of $1/S_1$ and $S_1$. Upon balance arm 286 is representative of $S_o^2 S_1^2$ which is transmitted by mechanical linkage 288 to variable resistance 188.

Arm 290 of bridge 216 is mechanically connected through linkage 292 to arm 242 of bridge 206. Arms 294 and 296 are set respectively to represent $1/S_1$ and $S_1$. Upon balance arm 298 represents $S_1^4$ which is transmitted through mechanical linkage 300 to set variable resistance 190 similarly.

Resistors 180, 182 and 184 are connected in series to obtain at terminals 302 and 304 the values of the numerator of $W_o$.

Also connected in series are resistances 186, 188 and 190 to provide at terminals 302 and 306 a resistance of a value corresponding to the denominator $W_o$. These make up adjacent arms of bridge 192. The third arm is set to unity. Upon balance the fourth arm 194 is set to provide a resistance equal to $W_o$. As shown above, this value is measured by voltmeter 200.

Once the input signal $S_t$ and the desired output $D_t$ are defined in terms of amplitude values at spaced time intervals it is merely a routine procedure for an operator to properly adjust apparatus such as that of FIGS. 3 and 4 to obtain the Wiener operator $W_r$. Also, the Wiener operator can be readily determined on a digital computer by an individual not necessarily skilled in geophysical exploration. In other words, such an individual is not required to make any interpretation or subjective reasoning, the procedure being routine.

While we have illustrated only a simple case where $S_t$ has two values, $S_o$ and $S_1$, and $D_t$ has three values, $D_o$, $D_1$ and $D_2$, more complicated expressions for $S_t$ and $D_t$ could be handled in the same manner.

The operation of this system will now be briefly reviewed. One first selects a drive or control signal for driving vibrator 10 which imparts such signal to the earth. Reflections of the impressed signal are detected by the geophones and recorded on recorder 24. The control signal can be any arbitrary signal desired.

As the signal which was imparted into the earth is rather long, it is desired to compress the detected recorded signal so that reflections are more readily apparent. One therefore selects the shape of the desired output $D_t$. The Wiener operator is then determined from the control signal and the preselected desired output. This can readily be accomplished by an electronic digital computer which is programmed to automatically compute $W_r$ from $S_t$ and $D_t$. Alternatively, $W_r$ is obtained from an analog device using Wheatstone bridges as illustrated in FIGS. 3 and 4. Since the Wiener operator is designed on a least-squares fit basis, the length of this operator can be much shorter than that of the input control signal, yet the agreement between the desired compressed pulse and the actually obtained compressed pulse will still be satisfactory. For example, it is normally preferred that $W_r$ be not longer than about one-half the duration of the drive signal.

After $W_r$ has been determined, the system of FIG. 2 is used to obtain the desired output. Potentiometers 36a to 36n are adjusted to represent the various values $W_o$, $W_1$, ..., $W_n$ of $W_r$.

The signal recorded by recorder 24 is played back from reproducing means 30 and fed through delay line 26. Each of the delay units 28a to 28n is set to represent one value of the time $\tau$ in the convolution equation (3), $$R_t = \sum_{\tau=0}^{n} W_\tau S_{t-\tau}$$

This device of FIG. 2 in effect moves the signal $S_t$ past the operator $W_r$ by incremental time shifts. The signal $S_t$ is multiplied by the operator to obtain a first product which is integrated or summed by adders 38a, 38b and 38c. As the signal $S_t$ passes through the delay line, the time between the two signals is in effect shifted, and $S_t$ in its new time (or phase) position is multiplied by the corresponding value of $W_r$ to obtain another product which is added or integrated by adder 38. This is repeated until the signal $S_t$ has passed through the delay line. The discrete values of $S_t$ and $W_r$ are such that the first product is $S_o W_o$. The order of progression of discrete values of $S_t$ and $W_r$ is such that as $S_t$ progresses from $S_o$, $S_1$, $S_2$, etc., it meets the Wiener operator values in the order $W_o$, $W_1$, $W_2$. The sum of the time delays 28 through 28n should be equal to the length of time of the operator $W_r$. The delay time T of each should also be equal to the time between the incremental values of $W_r$ represented by the potentiometer 36a to 36n. The output of adders 38 is recorded on recording means 40 as the function of the relative phase of the received signal $S_t$ and the operator $W_r$. In other words, the recorded output is a convolution of the received signal $S_t$ and the Wiener operator $W_r$. Or stated even differently, the received signal has been filtered in the time domain by the Wiener operator $W_r$. The result is that we have obtained an output signal which closely approximates the desired output $D_t$. Thus we have filtered the complex received signal in a manner to make the reflections from subsurface intervals more pronounced.

While there are disclosed above a limited number of illustrations and descriptions of this invention, various modifications can be made thereto without departing from the spirit and scope of the invention.

We claim:

1. A method of analyzing by an automatic data processing apparatus a recorded signal resulting from a transmitted signal using a Wiener operator W derived from such transmitted signal and a selected output which comprises:
    a. reproducing in said automatic data processing apparatus said received signal;
    b. convolving in said automatic data processing apparatus the said reproduced received signal with the Wiener operator $W_r$ to obtain the convolution thereof; and
    c. controlling a recorder with the convolution thus obtained.

2. A method in accordance with claim 1 in which the operator $W_r$ is not over about one half of the time duration of the transmitted signal.

3. A method of analyzing by an automatic data processing machine a received seismic signal resulting from a known drive signal impressed on the earth, said drive signal being any selected signal, and using a Wiener operator $W_r$ derived from said drive signal and a selected desired output signal, which comprises:
    a. creating seismic waves at a given location in accordance with said drive signal;
    b. receiving the resultant waves after traveling through the subsurface;
    c. reproducibly recording such received waves as a received signal;
    d. convolving within said automatic data processing machine the said received signal with said operator $W_r$ to form a convolution; and
    e. controlling a recorder with the convolution thus obtained.

4. A method in accordance with claim 3 in which the operator $W_r$ is not over about one half the time duration of the drive signal.

5. A method of analyzing by an automatic data processing apparatus a recorded seismic signal resulting from a transmitted signal using a Wiener operator $W_r$ derived from such transmitted signal and a selected output which comprises:
    a. reversing in time either said operator $W_r$ or said recorded seismic signal;
    b. then multiplying in said automatic data processing apparatus the recorded seismic signal by said $W_r$ in one time relationship;
    c. integrating in said automatic data processing apparatus the first product of said multiplication;
    d. repeatedly changing the time shift between said recorded seismic signal and said $W_r$;
    e. repeating steps (b) and (c) for each such change; and
    f. controlling a recorder with the value of the integral obtained for each such change.

6. A method in accordance with claim 5 in which the time duration of the operator is not over about one half that of the control signal.

7. A method of analyzing, by an automatic data processing apparatus, a recorded seismic signal resulting from a transmitted signal having a known control signal and using a selected output signal which comprises:
    a. obtaining a Wiener operator $W_r$ as an electrical signal from such control signal and said selected output signal;
    b. reversing in time said operator $W_r$ to obtain a time reversed $W_r$;

c. multiplying within said automatic data processing apparatus the recorded seismic signal by said reversed $W_r$ in one time relationship to obtain a first product;

d. integrating within said automatic data processing apparatus the first product of said multiplication;

e. repeatedly changing the time shift within said automatic data processing apparatus between said recorded seismic signal and said time reversed $W_r$;

f. repeating steps (c) and (d) for each such time shift; and g. controlling a recorder with the value of the integral obtained for each value of time shift.

8. A method in accordance with claim 7 in which the selected output signal is not over about one half of the time duration of the control signal.

9. A method of analyzing a received seismic signal resulting from a known drive signal impressed on the earth, said drive signal being repetitive during the period of time of the greatest travel time to be measured and using a Wiener operator $W_r$ derived from said drive signal and a desired output signal which comprises:

a. creating seismic waves at a given location in accordance with said drive signal;

b. receiving the resultant waves after traveling through the subsurface;

c. reproducibly recording such received waves as a received signal;

d. convolving said received signal with the operator $W_r$ to obtain a convolution thereof; and e. controlling a recorder with the convolution thus obtained.

10. A method of analyzing, by an automatic data processing apparatus, a received seismic signal resulting from a known drive signal impressed upon the earth and using a Wiener operator $W_r$ expressed as spaced apart coefficients and derived from said drive signal and a desired output signal, which comprises:

a. creating seismic waves at a given location in accordance with said drive signal;

b. receiving the resultant waves after traveling through the subsurface;

c. reproducibly recording such received waves as a received signal;

d. at an instant of time multiplying, in said automatic data processing apparatus, the amplitudes of said received signals at appropriately spaced intervals by said coefficient of said Wiener operator $W_r$ to form a first product, either said received signal or said operator $W_r$, but not both, being reversed in time;

e. integrating within said automatic data processing apparatus said product over the time duration of said operator $W_r$;

f. repeatedly changing, within said automatic data processing apparatus, the time shift between said received signal and the coefficients of said operator $W_r$;

g. repeating steps (d) and (e) for each such change in time relationship; and h. recording the value of the integral obtained for each change in time relationship as a function of the time relationship.

11. A method of analyzing a received seismic signal resulting from a known drive signal impressed upon the earth and using a Wiener operator $W_r$ expressed as spaced apart coefficients and derived from said drive signal and a desired output signal, said drive signal is repetitive during the period of time of the greatest travel time to be measured, which comprises:

a. creating seismic waves at a given location in accordance with said drive signal;

b. receiving the resultant waves after traveling through the subsurface;

c. reproducibly recording such received waves as a received signal;

d. at an instant of time multiplying the amplitudes of said received signals at appropriately spaced intervals by said coefficient of said Wiener operator $W_r$ to form a first product, either said received signal or said operator $W_r$, but not both, being reversed in time;

e. integrating said product over the time duration of said operator $W_r$;

f. repeatedly changing the time shift between said received signal and the coefficients of said operator $W_r$;

g. repeating steps (d) and (e) for each such change in time relationship; and h. recording the value of the integral obtained for each change in time relationship as a function of the time relationship.

12. A method of analyzing a received seismic signal resulting from a known drive signal impressed on the earth, using Wiener operator $W_r$ derived from said drive signal and a selected desired output signal, and further using a delay line having a plurality of spaced outputs and a plurality of potentiometers having adjustable settings, the method which comprises:

a. creating seismic waves at a given location in accordance with said drive signal;

b. receiving the resultant waves after traveling through the subsurface;

c. reproducibly recording such received waves as a received seismic signal;

d. connecting a plurality of said potentiometers equal in number to the coefficients sufficient to define the Wiener operator $W_r$ to spaced outputs along said delay line;

e. adjusting the settings of each of the potentiometers in accordance with the reverse order corresponding to values of the coefficients of $W_r$;

f. reproducing said received seismic signal and passing it into said delay line;

g. adding the outputs of said potentiometers in proper phase corresponding to the sign of the coefficients of $W_r$; and h. recording the added outputs as a function of time.

* * * * *

PO-1050
(5/69)

UNITED STATES PATENT OFFICE
CERTIFICATE OF CORRECTION

Patent No. 3,680,040            Dated July 25, 1972

Inventor(s) Daniel Silverman and Sven Treitel

It is certified that error appears in the above-identified patent and that said Letters Patent are hereby corrected as shown below:

Column 4, line 38, "with the input $S_t$" should not be in italics, (page 9, line 3, of Application).

Column 4, equation (3), first sub "$\tau$-o" should be --$\tau$=o--, (page 9, equation (3), of Application).

Column 4, line 56, "$\tau$" is missing after "S", (page 9, line 15, of Application).

Column 6, line 8, before "signal" insert --input--, (page 11, line 21, of Application).

Column 6, line 11, after "4/21", omit --.--, (page 11, line 24, of Application).

Column 6, line 20, "occurences" should be --occurrences--, (page 11, line 30, of Application).

Column 6, equation (26), "$S_6^2$" should be --$S_0^2$--, (page 12, equation (26), of Application).

Column 7, line 8, "$S1^2$" should be --$S_1^2$--, (page 13, line 17, of Application).

Column 8, line 32, omit "Bridge" and insert before "has" --202--, (page 16, line 7, of Application).

Column 8, line 37, between "1" and "$D_0$", insert --/--, (page 16, line 11, of Application).

Column 9, line 48, there should be no indentation for a paragraph, (page 18, line 19, of Application).

Column 10, line 15, after "W", insert --$_\tau$--, (Claim 1, line 3, of Application).

Signed and sealed this 2nd day of January 1973.

(SEAL)
Attest:

EDWARD M. FLETCHER, JR.
Attesting Officer

ROBERT GOTTSCHALK
Commissioner of Patents